US008493035B2

(12) United States Patent
Antheunis et al.

(10) Patent No.: US 8,493,035 B2
(45) Date of Patent: Jul. 23, 2013

(54) CHARGING METHOD AND CIRCUIT USING INDIRECT CURRENT SENSING

(75) Inventors: Roland Albert Bertha Antheunis, Nijmegen (NL); Insun Van Loo, Nijmegen (NL); Robert Gerrit Hulshof, Nijmegen (NL)

(73) Assignee: ST-Ericsson SA, Plan-les-Ouates (CH)

( * ) Notice: Subject to any disclaimer, the term of this patent is extended or adjusted under 35 U.S.C. 154(b) by 1245 days.

(21) Appl. No.: 11/576,340

(22) PCT Filed: Sep. 21, 2005

(86) PCT No.: PCT/IB2005/053101
§ 371 (c)(1),
(2), (4) Date: Apr. 2, 2008

(87) PCT Pub. No.: WO2006/035365
PCT Pub. Date: Apr. 6, 2006

(65) Prior Publication Data
US 2008/0258689 A1    Oct. 23, 2008

(30) Foreign Application Priority Data
Sep. 29, 2004    (EP) .................................... 04104759

(51) Int. Cl.
*H02J 7/06* (2006.01)
*H02J 7/00* (2006.01)

(52) U.S. Cl.
USPC ......................................... 320/163; 320/162

(58) Field of Classification Search
USPC ......... 320/151, 152, 156, 161, 165, 157–159, 320/162–164; 20/162, 163
See application file for complete search history.

(56) References Cited

U.S. PATENT DOCUMENTS

| 5,422,559 | A | * | 6/1995 | Hall et al. ..................... 320/139 |
| 6,154,012 | A | * | 11/2000 | Drori ............................ 320/162 |
| 6,351,110 | B1 | * | 2/2002 | Pappalardo et al. .......... 323/285 |
| 6,407,534 | B1 | * | 6/2002 | Mukainakano ............... 320/162 |
| 6,573,688 | B2 | * | 6/2003 | Nakanishi ..................... 320/135 |

(Continued)

FOREIGN PATENT DOCUMENTS

| GB | 2 331 639 A | 5/1999 |
| JP | 4261340 A | 9/1992 |
| JP | 08-103034 | 4/1996 |
| JP | 2004259902 A | 9/2004 |

OTHER PUBLICATIONS

International Search Report dated May 26, 2006 in connection with International Patent Application No. PCT/IB2005/053101.

(Continued)

*Primary Examiner* — Richard V Muralidar
(74) *Attorney, Agent, or Firm* — Coats & Bennett, P.L.L.C.

(57) ABSTRACT

The present invention relates to a charging circuit and method for generating a charging current supplied to an output terminal (15) to which a battery (40) to be charged is connected. The charging current is indirectly sensed to generate a sensing current having a predetermined relation to the charging current. This sensing current is then compared to a generated predetermined reference current, wherein the charging current is controlled in response to the result of the comparison. Thereby, accuracy, system costs and power efficiency can be increased as a low-ohmic precision resistor is no longer required in the charge current branch of the circuit. Furthermore, the proposed solution enables a simple implementation of the circuit as an integrated circuit.

20 Claims, 4 Drawing Sheets

U.S. PATENT DOCUMENTS

| | | | |
|---|---|---|---|
| 6,686,723 | B1 | 2/2004 | Smith et al. |
| 7,173,476 | B2 | 2/2007 | Yamamoto et al. |
| 7,560,899 | B1 * | 7/2009 | Potanin et al. ............... 320/133 |
| 8,179,098 | B2 * | 5/2012 | Kurokawa et al. ............ 320/134 |
| 8,269,468 | B2 * | 9/2012 | Ju et al. ........................ 320/164 |
| 2002/0084772 | A1 | 7/2002 | Ruha et al. |

OTHER PUBLICATIONS

Written Opinion of the International Searching Authority dated May 26, 2006 in connection with International Patent Application No. PCT/IB2005/053101.

* cited by examiner

CHARGING METHOD AND CIRCUIT USING INDIRECT CURRENT SENSING The present invention relates to a charging circuit and method for generating a charging current supplied to an output terminal to which an element to be charged, such as a battery or accumulator is connected.

In conventional battery charging circuits which are used for example in wireless terminals or other handheld or movable devices, a relatively high current is required to be measured and monitored during charging. Typically, a series resistor is placed between a source of the charging current and the associated charging switch coupled to the battery to be charged. The battery charging current flows through the series resistor and the resulting voltage drop across the series resistor is sensed for controlling the charging cycle.

FIG. 2 shows a schematic circuit diagram of a conventional integrated battery charging circuit which comprises a wall plug connection terminal 5 for connection to a wall plug, and a battery connection 15 for connection to a battery to be charged. Furthermore, a switch device or pass device TP22, which passes the charging current $I_c$ and which may be implemented by a MOS (Metal Oxide Semiconductor) transistor, is provided to control the charging current $I_c$ which is supplied via a low ohmic sensing resistor $R_s$ and the battery connection terminal 15 to the battery to be charged. The voltage drop across the sensing resistor $R_s$ is measured by an operational amplifier OA1 having an offset voltage source 12 at one input terminal to define a predetermined offset voltage. Based on the measured voltage drop, a control signal is generated at the output of the operational amplifier OA1 and supplied to the control terminal or gate of the pass device TP22.

Hence, in the integrated battery charging circuit of FIG. 2, the charge current $I_c$ is sensed using the series resistor $R_s$ to convert the charge current $I_s$ into a voltage. The defined offset voltage is subtracted from the sensed voltage and fed to that operational or differential amplifier OA1. The output of the amplifier OA1 is used to drive a closed loop to control the charging current $I_c$.

A significant drawback of such conventional charging circuits results from the fact that the series resistor or measuring resistor is required to be a high precision resistor with a low ohmic value. Due to the significant current flowing through this measuring resistor it must also have a relatively large physical size in order to dissipate the resulting heat. The use of physically large resistors implies that a separate and discrete component must be used, as opposed to an integrated component. This leads to increased costs as well as increased complexity of manufacturing and testing operations. Moreover, the measuring resistor must be carefully positioned to prevent the detrimental heat effects on adjacent circuit components. In addition, due to the low ohmic value of the measuring resistor, the resulting voltage drawback is small and requires use of high resolution analog-to-digital converters to obtain accurate measurement results.

Moreover, the accuracy of the charging circuit or system of FIG. 2 is determined by the accuracy of the low ohmic high-current sense resistor $R_s$ and connecting tracks, the accuracy of the offset voltage source 12 connected to the battery connection, and the internal offset voltage of the OA1 relative to the offset voltage generated by the offset voltage source 12. The overall accuracy is thus limited by the practical limitation of the offset voltage, resulting in high power dissipation at the sensing resistor $R_s$ and high required voltage difference between the wall plug connection terminal 5 and the battery connection terminal 15. In addition to these design challenges, careful board layout using Kelvin connections to the sensing resistor $R_s$ is required for the integrated charging circuit.

Document US2002/0084772 A1 discloses a method and apparatus for measuring battery charge and discharge currents using a direct analog-to-digital conversion of a charge/discharge replica current, wherein the replica current is generated from the charging current and a closed loop current sink is operated for sinking the replica current. A digital output of the closed loop current sink is used as a measure of the magnitude of the charging current. In particular, a difference signal representing the voltage difference at the nodes where the charging current are obtained is used to force the potentials at these nodes to equal values. As a result, the replica current equals the charging current divided by a predetermined scaling factor. Due to the use of the scaling factor, a significant reduction in current flow through the measurement or sense resistor used for measuring the replica current enables a significantly larger ohmic value and further provides significantly less power dissipation. The resulting higher value of the measured voltage facilitates implementation of accurate digitizing.

It is an object of the present invention to provide a battery charging circuit and method, by means of which accuracy, power efficiency and system costs can be reduced, while keeping the circuit layout simple.

This object is achieved by a charging circuit as claimed in claim 1 and by a charging method as claimed in claim 11.

Accordingly, rather than using a voltage value for the processing, the obtained sensing or measuring current is directly used for further processing, i.e. compared to the reference current. A conversion of the charging current into a voltage value is thus not required. This leads to an improved performance due to the fact that the accuracy of the circuit is determined by factors well controlled in integrated circuit manufacturing. Moreover, system costs can be reduced, since there is no need for a relatively expensive low-ohmic precision resistor in the high charge current branch. The decreased required voltage drop between the charging circuit and the battery as a result of the absence of the measuring resistor in the high charge current branch leads to an increase power efficiency.

The simple comparison of the indirectly measured sensing current with the reference current leads to a simple application with relatively easy circuit layout of high current tracks on the board when applying an integrated charging circuit.

The sensing means may comprise first current mirror means for sensing the charging current using a current mirror technique. The current mirror technique simplifies integration of the indirect sensing means and thus keeps circuit dimensions small.

Furthermore, the predetermined relation may be a predetermined fixed fraction. Due to the fixed fraction, the sensing current will be significantly lower than the charging current, so that power dissipation or power loss during processing of the sensing current can be reduced.

The charging circuit can be an integrated circuit, wherein the current generating means can be arranged to generate the predetermined reference current based on a current flowing through a predetermined resistor. Thereby, the precision resistor which defines the nominal current does not have to be provided in the charging path, so that power loss can be reduced and a higher resistance value can be used. As an example, the predetermined resistor can be arranged as an external resistor connected to the integrated circuit. This provides the advantage that the integrated circuit can be kept small in size and the external resistor can be easily exchanged if required.

The current generating means may comprise a current digital-to-analog converter to which the reference current is supplied as a nominal reference current. More specifically, the current generating means may comprise second current mirror means for copying the current flowing through the predetermined resistor. Due to the provision of the current digital-to-analog converter, the actual charge current can be defined digitally by using the current through the external resistor as reference for the digital-to-analog converter. The comparing means may comprise summing means to which the reference current and the sensing current are supplied. Thereby, the obtained difference can be directly used as the control signal. More specifically, the summing means may be arranged to convert a difference between the reference current and the sensing current into a control voltage based on which the control signal is generated. This conversion principle combines subtraction function and conversion function in a single element and thus keeps the circuit design simple and compact.

Accuracy and insensitivity to variations of supply and charging voltage of the first and second current mirror means can be achieved by providing an improved current mirror means, which comprises first and second transistor means connected in a current mirror configuration, and additional third transistor means driven by an amplifier means connected between respective drain or collector terminals of the first and second transistor means. Thereby, the performance of the first and second current mirror means is improved by increasing the output impedance and decreasing the voltage difference between the drains or collectors of the transistors of the first and second current mirror means.

The present invention will now be described on the basis of preferred embodiments with reference to the accompanying drawings, in which.

The preferred embodiments will now be described on the basis of an integrated battery charging circuit where indirect current sensing is achieved based on a current mirror technique. However, it is to be noted that the indirect current sensing may alternatively be achieved by other indirect sensing or measurement techniques based for example on magnetic coupling techniques or other current sensing techniques which do not require a serial measurement resistor. In general, the term 'indirect sensing' is to be understood in a sense that the charging current is not required to directly pass through an electrically connected sensing device or element.

Figure 1:
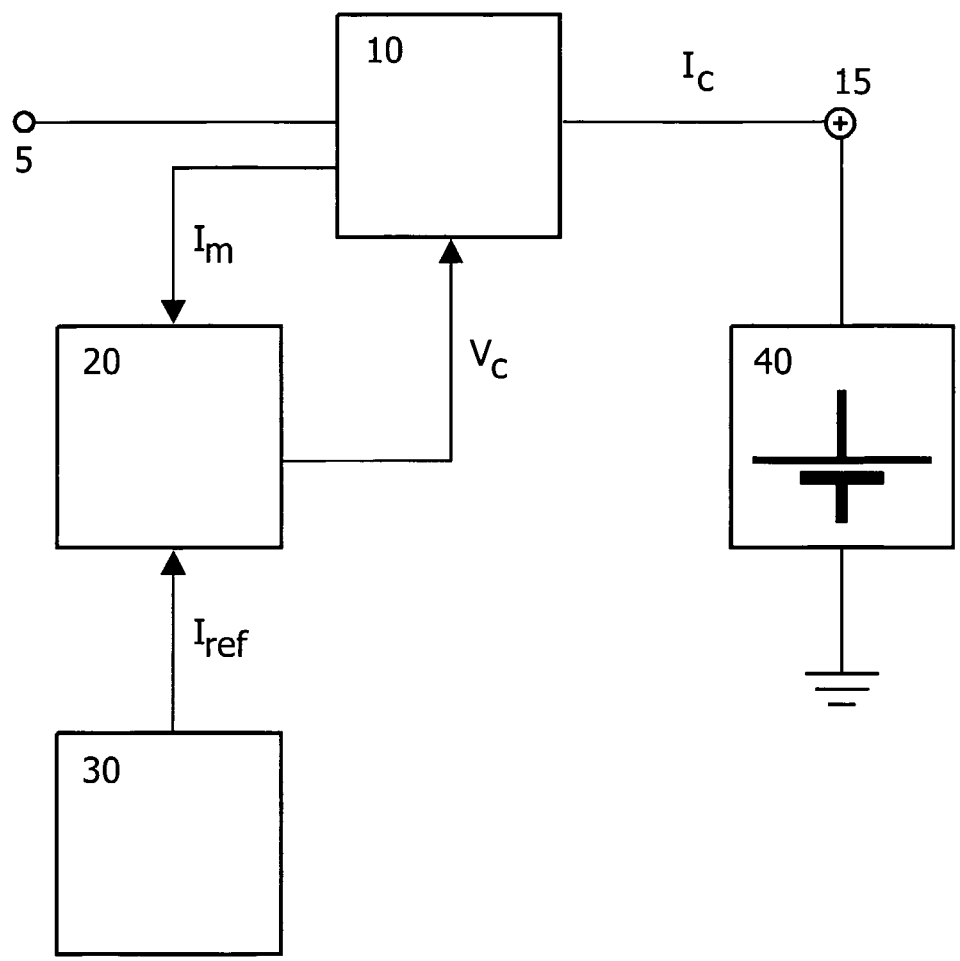
FIG. 1 shows a schematic block diagram of a charging circuit according to the preferred embodiments.

According to FIG. 1, a wall plug connection terminal 5 is provided, through which a connection towards a plug system for supplying the charging power is connected directly or via other charging circuit components. The charging power is supplied to a charge control circuit 10 which may be a simple pass or switching device, for generating a charging current $I_c$ to be supplied to a battery connection terminal 15 where an accumulator or battery 40 to be charged is connected. At the charging control device 10, a sensing current $I_m$ is indirectly measured in the above sense and supplied to a comparing device or element 20 to which a reference current $I_{ref}$ generated by a reference current generator 30 is also supplied. The comparing device 20 generates a control signal $V_c$ based on the difference between the sensing current $I_m$ and the reference current $I_{ref}$ and supplies this control signal to the charging control device 10. Thereby, the charging current $I_c$ can be controlled to provide a predetermined relationship between the reference current $I_{ref}$ and the charging current $I_c$, wherein the relationship can be defined by the measurement or coupling technique used to provide the sensing current $I_m$ or by the comparing technique used at the comparing device 20, or both.

Figure 3:
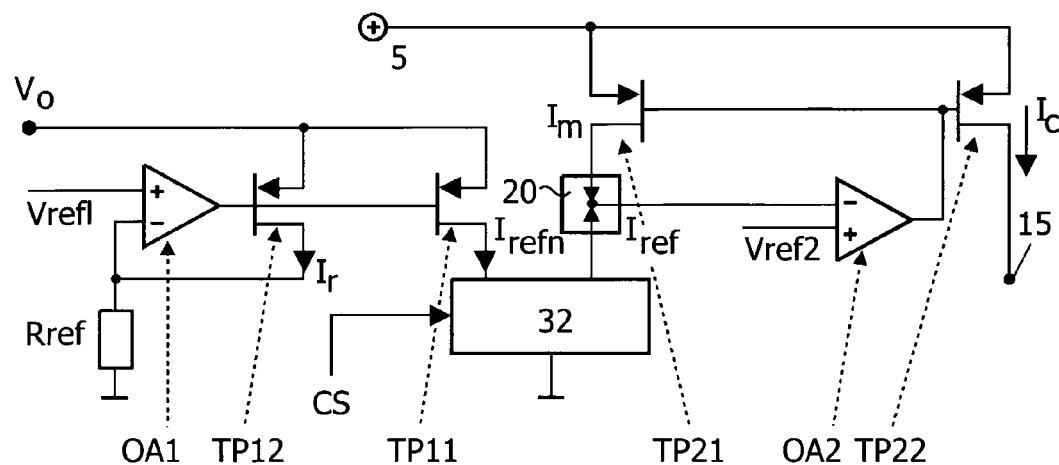
FIG. 3 shows a schematic circuit diagram of the charging circuit according to a first preferred embodiment.

FIG. 3 shows a more specific circuit diagram of an example of the first preferred embodiment, where a current mirror technique is used for indirect measurement of the charging current $I_c$. As can be gathered from FIG. 3, the charging control device 10 comprises a charge control transistor TP22 which controls the charging current $I_c$ based on a control voltage generated by an operational amplifier OA2. The charging current $I_c$ is measured or copied by a current mirror configuration established by an additional second transistor TP21 whose gate is connected to the gate of the charging control transistor TP22 and whose source is connected to the source of the charge control transistor TP22, to obtain a current mirror configuration. Hence, the measuring or sensing current $I_m$ flowing through the second transistor TP21 has a fixed relation to the charging current $I_c$. The sensing current $I_m$ is supplied to the comparing device 20 which is arranged as a summing node through which the sensing current $I_m$ and the reference current $I_{ref}$ which is generated by a current digital-to-analog converter (DAC) 32 are routed or passed.

The DAC 32 operates based on a current setting CS which may be a binary n-bit control word. A nominal reference current $I_{ref_n}$ is supplied to the DAC 32 as a nominal value based on which the reference current $I_{ref}$ is generated. The nominal reference current $I_{ref_n}$ is obtained by copying a resistor current $I_r$ flowing through a reference resistor $R_{ref}$ in a current generator circuit comprising an operational amplifier OA1 to which a reference voltage $V_{ref_1}$ is supplied and which controls a current source transistor TP12 which is arranged in a second current mirror configuration having a second transistor TP11 which generates the nominal reference current $I_{ref_n}$ as a copy of the resistor current $I_r$ at a predetermined ratio.

With this proposed circuit design according to the first preferred embodiment, the charging current $I_c$ is sensed in the control device 10 which comprises the charging control transistor TP22 and the second or mirror transistor TP21 using the current mirror technique. The obtained sensing current $I_m$ is thus a well-defined fixed fraction of the actual charging current $I_c$. Rather than converting the charging current $I_c$ into a voltage, the obtained sensing current $I_m$ is directly used for further processing at the comparing device 20, e.g. summing node.

The nominal or desired charging current can be set by the reference resistor $R_{ref}$ which can be an off-chip precision resistor. The actual charge current is defined digitally by the current setting CS using the resistor current $I_r$ through the reference resistor $R_{ref}$ as a reference for the DAC 32. The output current of the DAC 32 is subtracted at the summing node of the comparing device 20 from the sensing current $I_m$ by connecting the branches of the current mirror circuit and the DAC 32 to the summing node. The impedance of the summing node which may be implemented by a semiconductor element or a simple connection node converts the difference between the sensing current $I_m$ and the reference current $I_{ref}$ into a voltage which is fed to the operational amplifier OA2. At the other input terminal of the operational amplifier OA2, a second reference voltage $V_{ref2}$ is supplied to adjust the output control signal applied at the control terminal of the charging control transistor TP22.

In the following, the relation between the charge current $I_c$ and the parameters of the charging circuit are derived based on respective equations.

The charging current $I_c$ of the battery 40 flows through the charging control transistor TP22. The gate terminal of the charge control transistor TP22 is controlled by the output voltage of the operational amplifier OA2. The output signal of the operational amplifier OA2 also drives the gate voltage of the mirror transistor TP21. Since both gates and sources of the transistors TP22 and TP21 are connected, the current will be proportional to the ratio Ai of the sizes of the transistors. The sensing current $I_m$ flowing through the mirror transistor TP21 thus can be considered as an image of the charging current $I_c$, which can be expressed by the following equation:

$$I_c = Ai \cdot I_m \quad (1)$$

The sensing current $I_m$ and the reference current $I_{ref}$ are summed by connecting the respective current branches. The summing node of the comparing device 20 is connected to the input of the operational amplifier OA2. In the balanced closed loop, the sensing current $I_m$ will be adjusted by the operational amplifier OA2 and the mirror transistor TP21 in such a way that $I_m + I_{ref} = 0$. Therefore, $I_m = -I_{ref}$. Thus, based on equation (1), the following equation can be obtained:

$$I_c = -Ai \cdot I_{ref} \quad (2)$$

The reference current $I_{ref}$ is determined by the nominal reference current $I_{ref_n}$ and the n-bit current setting CS. The DAC 32 can be implemented by a conventional current mirror having n binary weighted output channels and n switches, wherein the binary values of the current setting CS define the switching states. Therefore, the reference current $I_{ref}$ can be expressed as follows:

$$I_{ref} = CS \cdot I_{ref_n} \quad (3)$$

The nominal reference current $I_{ref_n}$ is obtained from the drain current of the other mirror transistor TP12. The drain current of the other mirror transistor TP12 is proportional to the drain current of the current generator transistor TP11, i.e. the resistor current $I_r$, according to the ratio in size of the transistors TP12 and TP11. This can be expressed as follows:

$$I_{ref_n} = A_r \cdot I_r \quad (4)$$

wherein the parameter $A_r$ denotes the ratio of the size of the transistors TP11 and TP12.

The feedback loop of the operational amplifier OA1 and the current generator transistor TP11 assures that the voltage across the reference resistor $R_{ref}$ is equal to the reference voltage $V_{ref}$ plus the offset voltage $V_{oa1}$ of the operational amplifier OA1 and hence:

$$I_r = V_{ref}/R_{ref} \quad (5)$$

A combination of the equations (2), (3), (4) and (5) leads to the following expression for defining the value of the charge current $I_c$:

$$I_c = -Ai \cdot CS \cdot A_r \cdot (V_{ref1} + V_{oa1})/R_{ref} \quad (6)$$

Based on the above equation (6) it can be seen that the accuracy of the proposed charging circuit or system according to the first preferred embodiment is determined by the accuracy of the reference voltage $V_{ref1}$, wherein a value of e.g. +/−2% can be achieved in case of an internal bandgap reference voltage, which may even be improved by calibration. Furthermore, the accuracy is determined by the offset voltage $V_{oa1}$ of the operational amplifier OA1, relative to the reference voltage $V_{ref1}$. For accuracies better than 1%, an offset voltage smaller than 12 mV can be sufficient. Additionally, the accuracy of the charging circuit depends on the accuracy of the current mirror at the reference current generating circuitry, which consists of the transistors TP11 and TP12. Also, the accuracy of the DAC 32 which is determined e.g. by the current mirror(s) of which it is constructed. In addition, the accuracy of the charging current is determined by the other current mirror circuit comprising the charging control transistor TP22 and the mirror transistor TP21, and by the reference transistor $R_{ref}$ which can be placed externally and can be selected based on the application to obtain the required accuracy.

In summary, the overall accuracy of the charging circuit can be determined by factors well-controlled in integrated circuit manufacturing.

Figure 4:
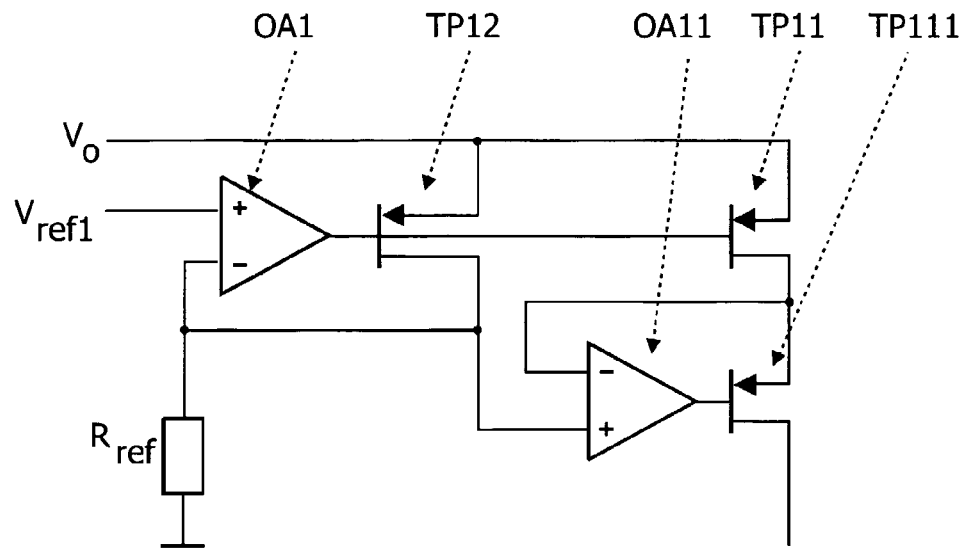
FIG. 4 shows a schematic circuit diagram of an improved current mirror circuit according to a second preferred embodiment.

FIG. 4 shows a schematic circuit diagram of a current mirror circuit according to a second preferred embodiment which is an improvement of the current mirror circuit consisting of the transistors TP11 and TP12 at the reference current generator part of the charging circuit. Using this improved current mirror circuit, an accuracy of the mirror ratio smaller than 1% can be achieved. The required accuracy and insensitivity to variations of supply and charging voltage can thus be obtained by using this improved current mirror circuit. In particular, the performance of the current mirror is improved by increasing the output impedance of the current mirror circuit and decreasing the voltage difference of the drains of the transistors TP11 and TP12. For this purpose, an additional third transistor TP111 is inserted at the drain of the transistor TP11 and is driven by an additional operational amplifier OA11 which is inserted with its input terminals respectively connected to the drains of the transistors TP12 and TP11.

Figure 5:
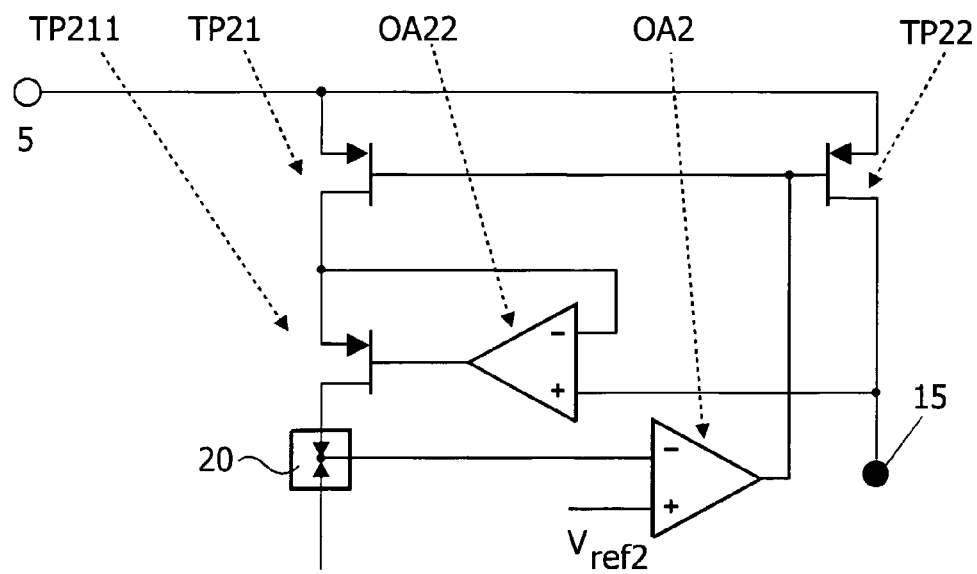
FIG. 5 shows a schematic circuit diagram of an improved current mirror circuit according to a third preferred embodiment.

FIG. 5 shows a schematic circuit diagram of a current mirror circuit according to a third preferred embodiment which is an improvement of the current mirror of the charging current control part of the charging circuit. Here, the current mirror consisting of the transistors TP21 and TP22 is improved by adding an additional third transistor TP211 at the drain of the mirror transistor TP21, wherein the additional third transistor TP211 is driven by an additional operational amplifier OA22 which input terminals are respectively connected between the drains of the transistors TP21 and TP22. Thereby, the output impedance of the mirror transistor TP21 is increased to align the drain voltages of the transistors TP21 and TP22.

The above modifications of the current mirror circuits according to the second and third preferred embodiments may be implemented separately or in combination in the charging circuit to improve the performance of the respective current mirror circuits.

Figure 6:
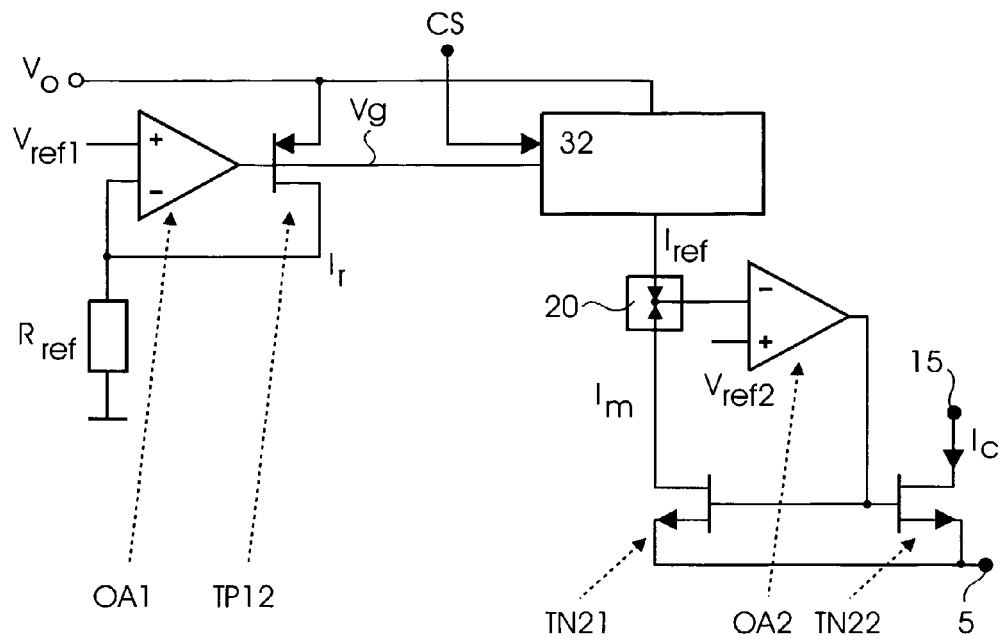
FIG. 6 shows a schematic block diagram of a charging circuit according to a fourth preferred embodiment.

FIG. 6 shows an alternative implementation of the charging circuit according to a fourth preferred embodiment, wherein transistors of an opposite polarity, e.g. NMOS transistors instead of PMOS transistors, are used in the charging control part. Instead of using the PMOS transistors shown in FIGS. 2 to 5, the proposed circuit can be translated to an equivalent circuit using NMOS transistors as shown in FIG. 6. Furthermore, contrary to the circuit of FIG. 2, one part of the current mirror circuit at the reference current generator part of the charging circuit is provided within the DAC 32, so that the gate voltage of the reference current generator transistor TP12 is directly supplied to the current mirror circuit of the DAC 32 as a gate bias voltage. In this alternative implementation, the sources of the charging control transistor TN22 and the mirror transistor TN21 are now connected via the wall plug connection terminal 5 to a negative terminal of the supply voltage, while in FIG. 3, the wall plug connection terminal 5 was connected to a positive polarity of the supply voltage. Consequently, the DAC 32 is now connected to a positive terminal of the supply voltage $V_o$, while it was connected to the reference potential (e.g. ground potential) in FIG. 3.

Regarding the operation of the alternative circuit shown in FIG. 6, it is referred to the above description of the first preferred embodiment, since the circuit operation according to the fourth preferred embodiment is equivalent to the circuit according to the first preferred embodiment.

Figure 2:
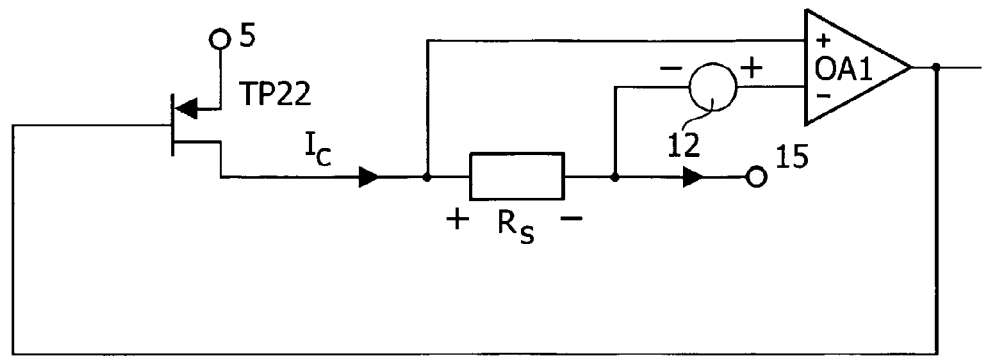
FIG. 2 shows a schematic circuit diagram of a conventional charging circuit according to the prior art.

Besides the above mentioned improvements of performance by accurately determined accuracy based on well-controlled factors in integrated circuit manufacturing, the proposed circuit design provides the advantages of reduced system costs due to the fact that an expensive low-ohmic precision resistor in the high current branch of FIG. 2 is no longer required. Moreover, power efficiency is increased due to the fact that, as a result of the absence of the resistor in the high current branch, the voltage drop between the supply voltage terminal 5 and the battery connection terminal 15 is reduced. Additionally, a relatively easy or simple layout of high current tracks can be provided in a circuit board, when the integrated charging circuit is implemented.

In summary, a battery charging circuit is proposed, which uses indirect current sensing and comprises a current mirror for obtaining a measured current which is proportional to the charging current. A control loop comprising a current mirror and an operational amplifier acting as an error amplifier is provided together with a DAC. The charging current is then proportional to the reference current provided by the DAC. This reference current can be determined by a reference voltage via an additional current mirror, while a digital control word can be applied as input to the DAC.

It is noted that the present invention is not restricted to the specific elements of the above preferred embodiments. In particular, the comparing device 20 may be based on another suitable element which can be used for summing or subtracting the sensing current $I_m$ and the reference current $I_{ref}$, such as for example a summing or differential amplifier or other amplifier or transistor circuits. The same applies to the operational amplifiers OA1 and OA2 which may be replaced by corresponding amplifier circuits with discrete elements. The transistors TP11, TP12, TP111, TP21, TP211, TP22, TN21 and TN22 may be implemented by any type of bipolar or unipolar transistor. The DAC 32 may be any DAC which can be controlled by a nominal reference value, wherein the nominal reference current $I_{ref_n}$ may even be converted into a digital value or a voltage value. The preferred embodiments may thus vary within the scope of the attached claims.

Furthermore, the described drawing figures are only schematic and are not limiting. In the drawings, the size of some of the elements may be exaggerated and not drawn on scale for illustrative purposes. Where the term 'comprising' is used in the present description and claims, it does not exclude other elements or steps. Where an indefinite or definite article is used when referring to a singular noun, e.g. 'a' or 'an', 'the', this includes a plurality of that noun unless something else is specifically stated. The terms first, second, third and the like in the description and in the claims are used for distinguishing between similar elements and not necessarily for describing a sequential or chronological order. It is to be understood that the embodiments of the invention described herein are capable of operating in other sequences than described or illustrated herein. Moreover, although preferred embodiments, specific constructions and configurations have been discussed herein, various changes or modifications in form and detail may be made without departing from the scope of the attached claims.

The invention claimed is:

1. A charging circuit for generating a charging current supply to an output terminal said charging circuit comprising:
    a current mirror comprising first and second transistors connected in a current mirror configuration, the first transistor coupled in series with a charging current supply line that is configured to carry the charging current, the second transistor configured to generate a sensing current having a predetermined relation to the charging current that flows through the first transistor;
    current generating means configured to generate a reference current;
    current comparing means configured to compare that sensing current with said reference current to generate a control signal; and
    control means configured to control said charging current in response to said control signal.

2. A circuit according to claim 1, wherein said predetermined relation is a predetermined fixed fraction.

3. A circuit according to claim 1, wherein said charging circuit is an integrated circuit, and said current generating means is configured to generate a predetermined reference current based on a current flowing through a predetermined resistor.

4. A circuit according to claim 3, wherein said predetermined resistor comprises an external resistor connected to said integrated circuit.

5. A circuit according to claim 3, wherein said current generating means comprises a current digital-to-analog converter configured to supply said reference current as a nominal reference current.

6. A circuit according to claim 3, wherein said current generating means comprise second current mirror means configured to copy said current flowing through said predetermined resistor.

7. A circuit according to claim 1, wherein said comparing means comprises summing means configured to supply said reference current and said sensing current.

8. A circuit according to claim 7, wherein said summing means are configured to convert a difference between said reference current and said sensing current into a control voltage based on which said control signal is generated.

9. A circuit according to claim 1, wherein said current mirror means comprise first and second transistor means connected in a current mirror configuration, and third transistor means configured to be driven by an amplifier means connected between respective drain or collector terminals of said first and second transistor means.

10. A charging circuit for generating a charging current supply to an output terminal said charging circuit comprising:
    sensing means configured to indirectly sense said charging current and configured to generate a sensing current having a predetermined relation to said charging current, the sensing means comprising a first current mirror means for sensing said charging current using a single voltage signal from a path through which the charging current passes, the first current mirror means comprising a first transistor means coupled in series with a charging current supply line that is configured to carry the charging current;

current generating means configured to generate a predetermined reference current;

current comparing means configured to compare that sensing current with said reference current to generate a control signal; and control means configured to control said charging current in response to said control signal.

11. A circuit according to claim 10, wherein said predetermined relation comprises a predetermined fixed fraction.

12. A circuit according to claim 10, wherein said charging circuit is an integrated circuit, and said current generating means is configured to generate a predetermined reference current based on a current flowing through a predetermined resistor.

13. A circuit according to claim 12, wherein said predetermined resistor comprises an external resistor connected to said integrated circuit.

14. A circuit according to claim 12, wherein said current generating means comprises a current digital-to-analog converter configured to supply said reference current as a nominal reference current.

15. A circuit according to claim 12, wherein said current generating means comprise second current mirror means configured to copy said current flowing through said predetermined resistor.

16. A circuit according to claim 10, wherein said comparing means comprises summing means configured to supply said reference current and said sensing current.

17. A circuit according to claim 16, wherein said summing means are configured to convert a difference between said reference current and said sensing current into a control voltage based on which said control signal is generated.

18. A circuit according to claim 10, wherein said current mirror means comprise first and second transistor means connected in a current mirror configuration, and third transistor means configured to be driven by an amplifier means connected between respective drain or collector terminals of said first and second transistor means.

19. A charging method comprising:

indirectly sensing a charging current and generating a sensing current having a predetermined relation to said charging current, the sensing means comprising a first current mirror means for sensing said charging current using a single voltage signal from a path through which the charging current passes, the first current mirror means comprising a first transistor means coupled in series with a charging current supply line that is configured to carry the charging current;

generating a predetermined reference current;

comparing that sensing current with said reference current to generate a control signal; and controlling said charging current in response to said control signal.

20. The charging method according to claim 19, wherein said current mirror means comprise first and second transistor means connected in a current mirror configuration, and third transistor means configured to be driven by an amplifier means connected between respective drain or collector terminals of said first and second transistor means.

* * * * *